United States Patent
Kang

(10) Patent No.: US 8,302,457 B2
(45) Date of Patent: Nov. 6, 2012

(54) COLLISION SENSOR FOR WOOD PROCESSING EQUIPMENT

(75) Inventor: Tony Yan Kang, Burnaby (CA)

(73) Assignee: Carmanah Design and Manufacturing Inc., Vancouver (CA)

( * ) Notice: Subject to any disclaimer, the term of this patent is extended or adjusted under 35 U.S.C. 154(b) by 339 days.

(21) Appl. No.: 12/799,976

(22) Filed: May 4, 2010

(65) Prior Publication Data

US 2011/0272514 A1 Nov. 10, 2011

(51) Int. Cl.
*G01M 7/00* (2006.01)
(52) U.S. Cl. ...................................................... 73/12.09
(58) Field of Classification Search .................. 73/12.09
See application file for complete search history.

(56) References Cited

U.S. PATENT DOCUMENTS

| | | | |
|---|---|---|---|
| 4,088,856 A | 5/1978 | Tebben | |
| 4,293,752 A | 10/1981 | Koenig | |
| 4,865,094 A | 9/1989 | Stroud et al. | |
| 5,323,975 A | 6/1994 | Fulghum, Jr. | |
| 5,575,372 A | 11/1996 | Huebner et al. | |
| 5,655,582 A | 8/1997 | Morin | |
| 5,693,921 A | 12/1997 | Miller et al. | |
| 5,974,928 A * | 11/1999 | Boldrini | 83/562 |
| 6,172,315 B1 | 1/2001 | Miller et al. | |
| 7,267,146 B2 * | 9/2007 | Olofsson | 144/176 |
| 8,051,887 B2 * | 11/2011 | Robinson et al. | 144/373 |
| 2004/0060616 A1 | 4/2004 | Jonkka et al. | |

FOREIGN PATENT DOCUMENTS

WO WO2009112627 * 10/2008

\* cited by examiner

*Primary Examiner* — Lisa Caputo
*Assistant Examiner* — Octavia Davis-Hollington
(74) *Attorney, Agent, or Firm* — Kilpatrick Townsend & Stockton LLP

(57) ABSTRACT

A sensor system for detecting a collision between first and second parts moving relative to each other. The sensor system comprises at least one sensor for detecting a collision between the first and second parts, the sensor comprising first and second elongate conductive elements and a non-conducting spacing element partially extending between the first and second elongate conductive elements to separate the conductive elements from each other and to define spaced, adjacent portions of the conductive elements. A signal transmitting wire is in communication with each elongate conductive element. A housing retains the sensor for mounting in a region between the first and second parts such that any collision between the parts will tend to deform the spaced, adjacent portions of the conductive elements into contact with each other at the point of collision to complete a circuit via the signal transmitting wires to indicate the collision has occurred. In a preferred arrangement the moving parts are part of a wood processing unit, and the signal is used to shutdown the unit to prevent damage. The sensor and sensory system described offer improved reliability as compared to previous designs.

20 Claims, 4 Drawing Sheets

COLLISION SENSOR FOR WOOD PROCESSING EQUIPMENT

FIELD OF THE INVENTION

This invention relates to a sensor and sensor system for a wood processing unit, such as a wood chipper, to detect contact between parts of the unit, such as a cutting member and an anvil member for supporting wood to be processed.

BACKGROUND OF THE INVENTION

Wood processing equipment such as chippers and flakers generally rely on fast moving cutting blades or knives being moved past stationary wood pieces to produce chip or flake products. As best shown in FIG. 1, which is a schematic view of an exemplary cutting disc arrangement, knives 10 are mounted to a rotating disc 12 that rotates in the direction of arrow 11 past an anvil surface 14. Wood pieces 16 are supported on anvil 14, and the cutting disc is advanced in the direction of arrow 13 into the wood pieces so that knives 10 cut flakes or chips from the wood pieces. For safety reasons, it is desirable to have a sensing system 18 in place to detect if the rotating knives come in contact with the anvil either directly or indirectly by means of foreign material in the wood pieces. The sensing system acts as an early warning system so that if parts do make contact as they move past each other, the system can quickly and reliably detect such an event and shut down the machinery promptly to mitigate further damage to the equipment. In the case of the cutting disc arrangement shown in FIG. 1, an event such as loosening of a cutting knife 10 resulting in movement out of the rotational plane of the disc and contact with the anvil would trip the sensing system. In an alternative scenario, foreign material such as metal in the wood piece may be picked up by the knife and brought into contact with the anvil to activate the sensing system. In both situations, the sensing system acts to stop advancement of the cutting disc, partially retract the disc, and initiate a shutdown to prevent further damage. Given the high inertial loads of the rotating disc, the shutdown of the equipment can take several minutes.

Previous methods and systems for detecting contact between parts include proximity sensors, however, these tend to require careful calibration and are often unreliable due to lack of resolution.

Existing contact sensor systems known to the applicant also include the use of light based detectors that detect a laser or LED light beam through a light tube positioned in a region where parts move relative to each other. For example, in the typical arrangement illustrated in FIG. 1, the light tube would be positioned on the leading edge 18 of the anvil 14 adjacent the rotating knives 10. If the knives or foreign material should contact the anvil and in turn deform the light tube, light will be prevented from reaching the detector thereby signaling a collision requiring quick shutdown of the wood processing equipment. Due to the operating environment in which the sensor is positioned, light based systems tends not to operate reliably. Moisture ingress due to high vibration cycles or condensation due to temperature fluctuations tends contaminate the interior of the light tube to block the light and produce a false collision signal. The light tube arrangement also requires a reliable light source as any intermittent failure of the light will also be detected as a false collision. Light based system are also susceptible to reliability issues due to a need for tuning of the light detector as it is an analog device that requires a potentiometer to be 'dialed' during setup. If calibrated incorrectly, the sensor may miss collisions or detect non-existent collisions.

False or missed collision detections in any system are undesirable. False collision detections result in unnecessary shutdown of the equipment which can be time consuming to restart with resulting expensive losses in production. Missed collision detections result in damage to the equipment that may be expensive to repair or replace.

SUMMARY OF THE INVENTION

To address the foregoing problems, applicant has developed an accurate and reliable system for detecting collisions between moving parts as a component of the system for shutting down the machinery.

Accordingly, the present invention provides a sensor for detecting a collision between first and second parts moving relative to each other, the sensor comprising:

first and second elongate conductive elements;

a non-conducting spacing element partially extending between the first and second elongate conductive elements to separate the conductive elements from each other and to define spaced, adjacent portions of the conductive elements; and a signal transmitting wire in communication with each elongate conductive element;

the sensor being mountable in a region between the first and second parts such that the collision between the parts will tend to deform the spaced, adjacent portions of the conductive elements into contact with each other at the point of collision to complete a circuit via the signal transmitting wires to indicate the collision has occurred.

Accordingly, the present invention also provides a sensor system for detecting a collision between first and second parts moving relative to each other, the sensor system comprising:

at least one sensor for detecting the collision, the sensor comprising:

first and second elongate conductive elements;

a non-conducting spacing element partially extending between the first and second elongate conductive elements to separate the conductive elements from each other and to define spaced, adjacent portions of the conductive elements; and a signal transmitting wire in communication with each elongate conductive element;

a housing for retaining the at least one sensor;

the housing being mountable in a region between the first and second parts such that the collision between the moving parts will tend to deform the spaced, adjacent portions of the conductive elements into contact with each other at the point of collision to complete a circuit via the signal transmitting wires to indicate the collision has occurred.

In a preferred arrangement, the sensor and sensor system are employed in wood processing equipment to detect any collisions between the cutting knives and the anvil of the equipment.

BRIEF DESCRIPTION OF THE DRAWINGS

Aspects of the present invention are illustrated, merely by way of example, in the accompanying drawings in which.

DESCRIPTION OF THE PREFERRED EMBODIMENTS

Figure 2:
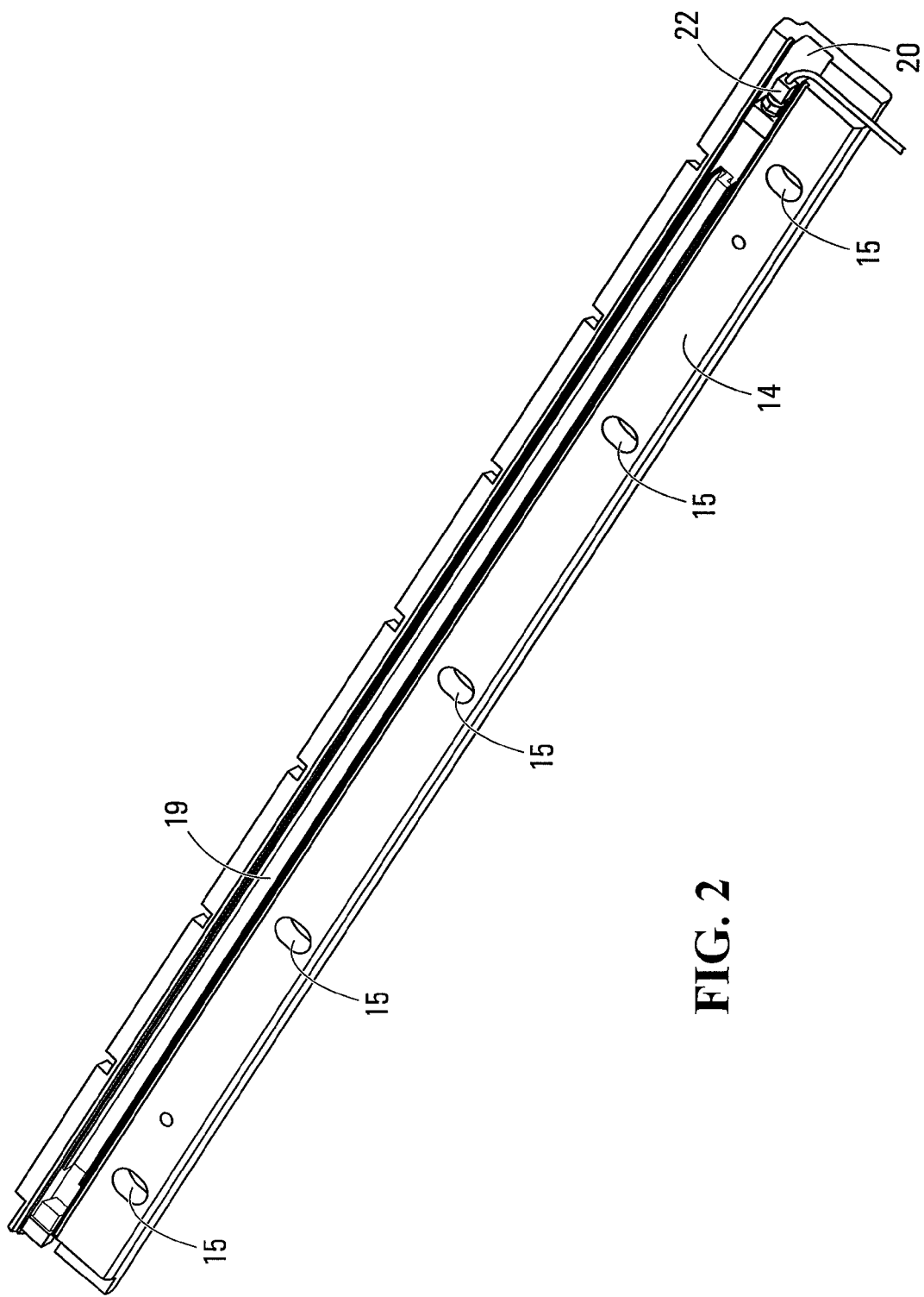
FIG. 2 is a detail perspective view of an embodiment of the sensor system according to the present invention.
Figure 3:
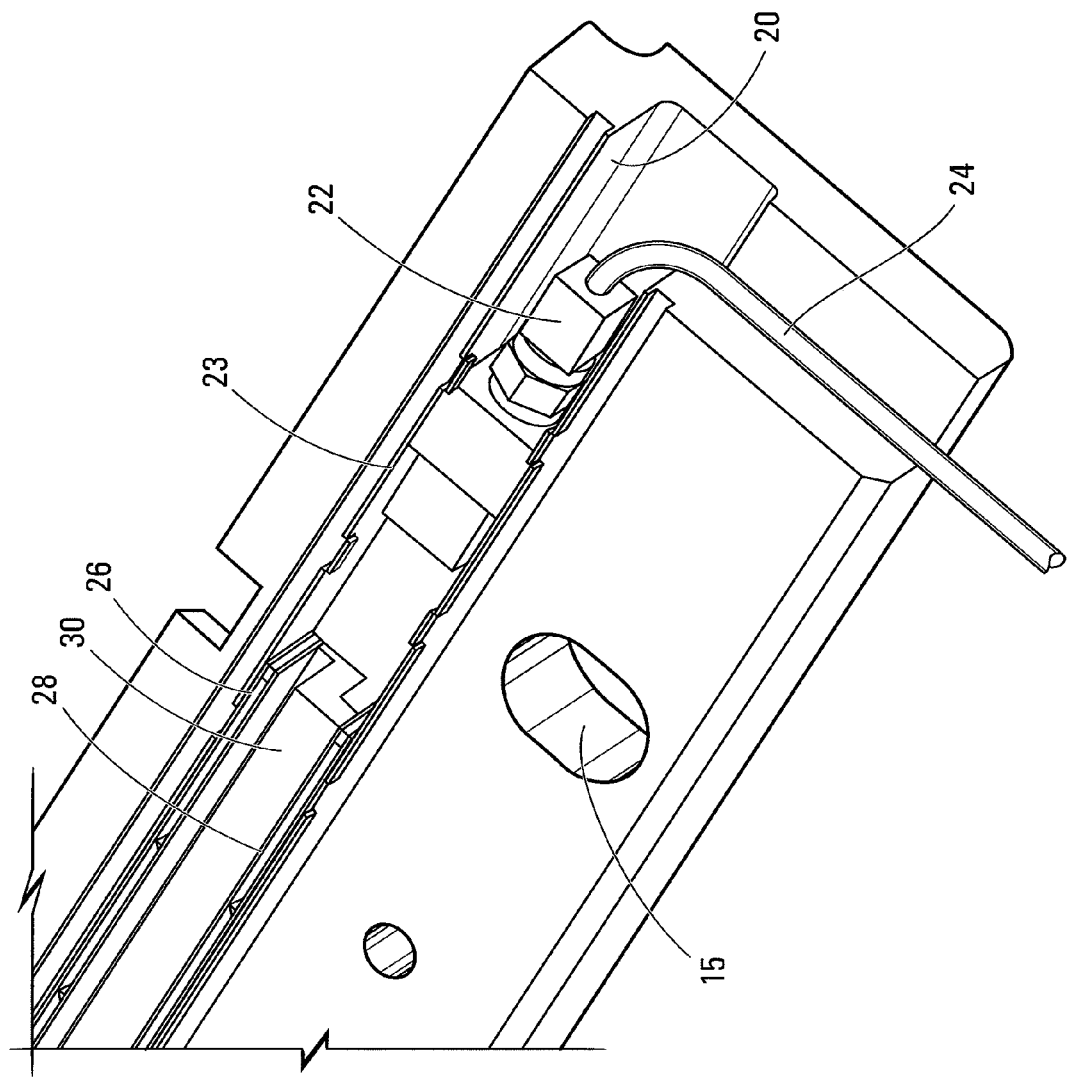
FIG. 3 is a detail view of the sensor system of FIG. 2.
Figure 4:
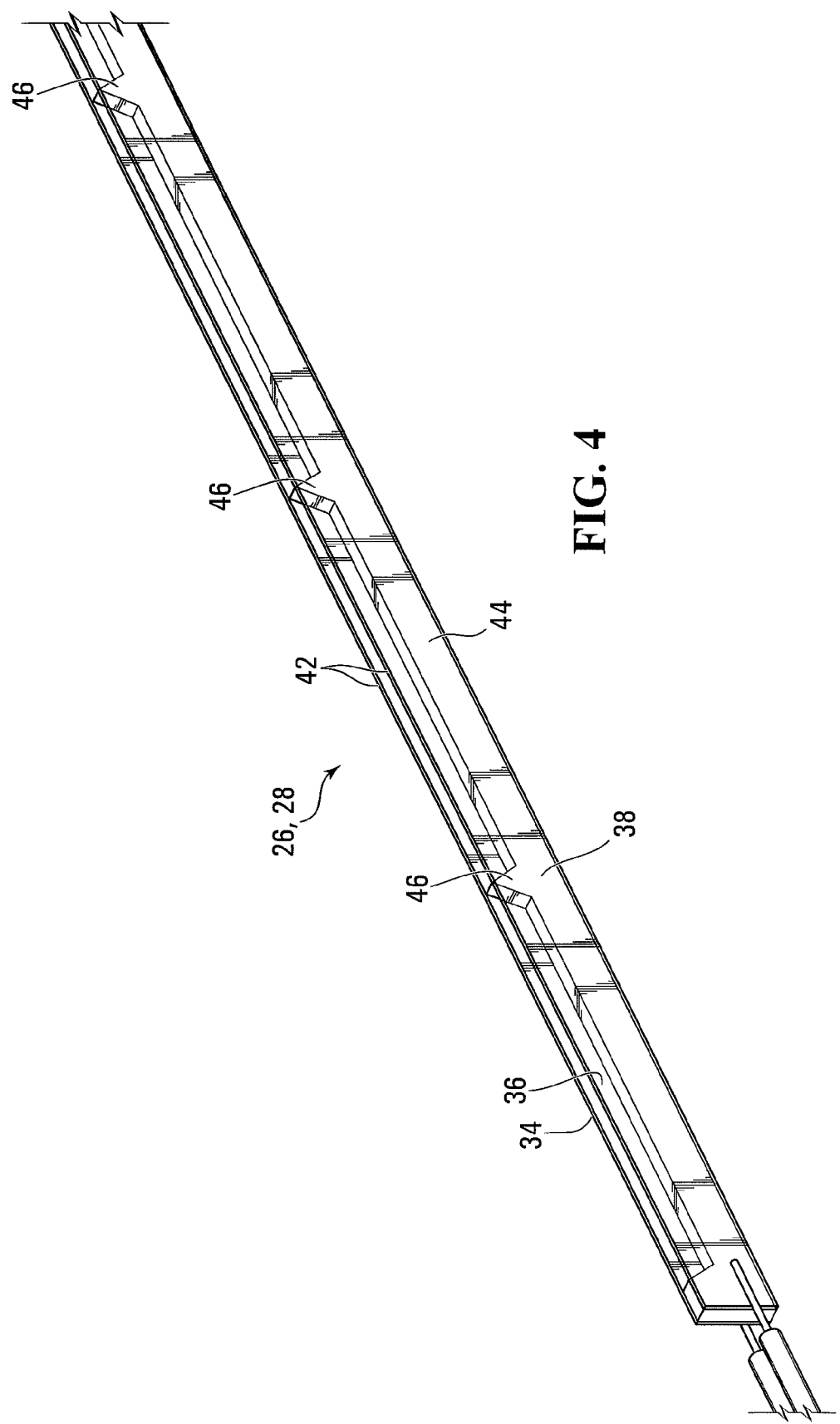
FIG. 4 is a detail view of a component sensor of the sensor system of FIG. 2.

Referring to FIGS. 2 to 4, there are shown various aspects of a preferred exemplary sensor system and individual sensor for detecting collisions between moving parts.

The sensor and sensor system are installable in any arrangement having parts that move relative to each other. The sensor and sensor system find particular application in wood processing equipment to detect collisions between components such as cutting knives and anvils, however, the skilled person will appreciate that the disclosed invention is not limited to use in only this environment. Other equipment that has first and second parts moving relative to each other and requiring monitoring to detect collisions between parts can make use of the sensor and sensing system described herein. For example, food processing equipment for cutting or slicing food products may make use of the sensor and sensor system described herein.

Figure 1:
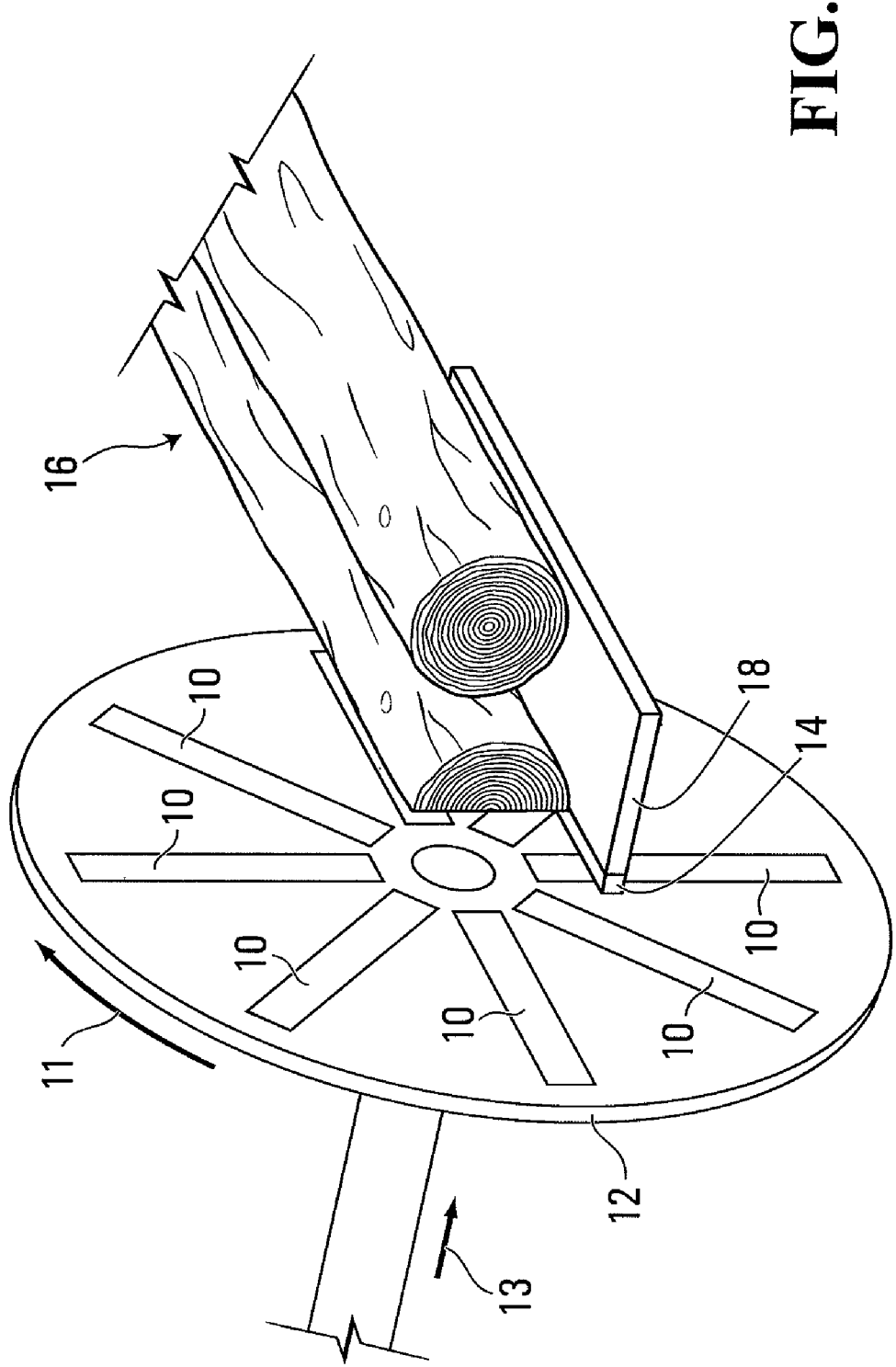
FIG. 1 is a schematic view of a typical wood processing unit in which the sensor and sensor system of the present invention finds application.

FIG. 1 shows schematically a preferred operating environment for the sensor system at the leading edge 18 of anvil 14 of a disc flaking arrangement. In fact, the sensor system may be incorporated into the anvil, as best shown in FIG. 2 which shows the underside of the anvil 14 with the sensor system 19 installed in a housing in the form of a channel or slot 20 extending the length of the anvil. System 19 includes an end plug 22 with a wiring harness 24 to connect the system with control equipment. Anvil includes openings 15 to permit bolting of the anvil to the wood processing equipment in a conventional manner.

FIG. 3 is a detail view of the underside side of the anvil showing the end plug 22 and channel 20, and a pair of collision sensors 26 and 28 installed at either side of channel 20. Each sensor 26 or 28 is held in place against the side of the channel 20 by a sensor retaining member. In the illustrated embodiment, the sensor retaining member is a generally Z shaped member 30, however, the skilled person will realize that any number of alternative arrangements are possible for holding one or more sensors in a fixed position. Member 30 is preferably made from a hard UHMW plastic and serves to wedge collision sensors 26 and 28 in place against the side walls of channel 20 with the upper leg of the Z engaging sensor 28 and the lower leg of the Z engaging sensor 26 to hold them against opposite sides of the channel.

FIG. 4 is a detail view of a portion of an individual collision sensor 26 or 28. Each collision sensor comprises a pair of first and second conductive elements or strips 34,36 sandwiching a non-conducting spacing element 38. Non-conducting, spacing element 38 partially extends between the first and second elongate conductive elements to separate the conductive elements from each other and to define spaced, adjacent portions of the conductive elements. In the illustrated embodiment, the spaced, adjacent portions of the conductive elements are the upper regions 42 of the elements while the lower regions 44 of the conductive elements have spacing element 38 interposed therebetween. In FIG. 4, first and second conductive elements 34, 36 are depicted as being translucent to clearly show non-conducting spacing element 38 therebetween. A separate wire 40 is connected to each conducting element 34 and 36. In a preferred arrangement, conductive elements 34 and 36 are formed from stainless steel and non-conducting spacing element 38 is formed from rubber. In the sensor's default configuration, conductive elements 34 and 36 do not touch and to ensure that upper regions 42 defining the spaced, adjacent portions of the conductive elements remain separated unless subject to a significant force, non-conducting spacing element 38 is preferably formed with a plurality of regularly spaced upstanding projections 46 along the length of the element that extend between the upper regions. In the illustrated embodiment of FIG. 4, the upstanding projections are generally triangular in shape, but other shapes that serve to maintain the spacing of the conductive elements 34,36 are also appropriate.

In the event of a knife or foreign material contacting the anvil, channel 20 of the anvil will tend to be deformed at the region of contact. As a result the spaced, adjacent portions of the conductive elements 34,36 will tend to deform into contact with each other (pinch together) to complete a circuit thereby sending a signal via wires 40. Depending if one or both contact sensors 26, 28 is deformed with channel 20 to generate a signal, the severity of the deformation contact can be determined. As in conventional systems, the signal from wires 40 is used to generate an emergency shutdown of the wood processing unit to minimize further damage.

The sensing system associated with the sensors preferably monitors the condition of each sensor. If a wire in wiring harness 24 breaks or otherwise becomes disconnected within or outside the sensor, the system will indicate a fault condition and shutdown the equipment.

While the arrangement illustrated in FIGS. 2 to 4 uses a pair of sensors 26, 28 in a channel 20, it is understood that a single sensor may also be used. Similarly, more than two sensors may be used. The sensors are not limited to being mounted in a channel. It is sufficient that a sensor according to the present invention is mounted in a region that will be exposed to the force of a collision between moving parts.

Although the present invention has been described in some detail by way of example for purposes of clarity and understanding, it will be apparent that certain changes and modifications may be practised within the scope of the appended claims.

I claim:

1. A sensor for detecting a collision between first and second parts moving relative to each other, the sensor comprising:

first and second elongate conductive elements;

a non-conducting spacing element partially extending between the first and second elongate conductive elements to separate the conductive elements from each other and to define spaced, adjacent portions of the conductive elements; and a signal transmitting wire in communication with each elongate conductive element;

the sensor being mountable in a region between the first and second moving parts such that the collision between the moving parts will tend to deform the spaced, adjacent portions of the conductive elements into contact with each other at the point of collision to complete a circuit via the signal transmitting wires to indicate the collision has occurred.

2. The sensor of claim 1 wherein the first and second elongate conductive elements comprise deformable strips of a metal.

3. The sensor of claim 1 wherein the non-conducting spacing element comprises a strip of insulating material.

4. The sensor of claim 3 wherein the insulating material is rubber.

5. The sensor of claim 1 wherein the non-conducting spacing element comprises a strip of material formed with protrusions to promote separation of the spaced, adjacent portions of the conductive elements.

6. The sensor of claim 1 wherein the first part is a cutting knife of a wood processing machine and the second part is an anvil of the wood processing machine with the sensor being installable into a channel within the anvil to detect collision between the knife and the anvil.

7. A sensor system for detecting a collision between first and second parts moving relative to each other, the sensor system comprising:
at least one sensor as defined in claim 1; and
a housing for retaining the at least one sensor.

8. The sensor system of claim 7 in which the housing includes two sensors.

9. The sensor system of claim 8 in which the housing comprises a channel and the two sensors are positioned at opposite sides of the channel.

10. The sensor system of claim 9 including a sensor retaining member to hold the sensors in position within the channel.

11. The sensor system of claim 10 in which the sensor retaining member comprises a strip insertable between the two sensors to hold the sensors in place at the opposite sides of the channel.

12. The sensor system of claim 10 in which the sensor retaining member is a generally Z shaped member with the upper leg of the Z engaging one of the two sensors and the lower leg of the Z engaging the other of the two sensors to wedge them against opposite sides of the channel.

13. The sensor system of claim 10 in which the sensor retaining member is formed from a hard ultrahigh molecular weight plastic.

14. A sensor system for detecting a collision between first and second parts moving relative to each other, the sensor system comprising:
at least one sensor for detecting the collision, the sensor comprising:
first and second elongate conductive elements;
a non-conducting spacing element partially extending between the first and second elongate conductive elements to separate the conductive elements from each other and to define spaced, adjacent portions of the conductive elements; and
a signal transmitting wire in communication with each elongate conductive element;
a housing for retaining the at least one sensor;
the housing being mountable in a region between the first and second parts such that the collision between the moving parts will tend to deform the spaced, adjacent portions of the conductive elements into contact with each other at the point of collision to complete a circuit via the signal transmitting wires to indicate the collision has occurred.

15. The sensor system of claim 14 in which the housing includes two sensors.

16. The sensor system of claim 15 in which the housing comprises a channel and the two sensors are positioned at opposite sides of the channel.

17. The sensor system of claim 16 including a sensor retaining member to hold the sensors in position within the channel.

18. The sensor system of claim 17 in which the sensor retaining member comprises a strip insertable between the two sensors to hold the sensors in place at the opposite sides of the channel.

19. The sensor system of claim 17 in which the sensor retaining member is a generally Z shaped member with the upper leg of the Z engaging one of the two sensors and the lower leg of the Z engaging the other of the two sensors to wedge them against opposite sides of the channel.

20. The sensor system of claim 17 in which the sensor retaining member is formed from a hard ultrahigh molecular weight plastic.

* * * * *